(12) United States Patent
Sayama et al.

(10) Patent No.: US 7,238,902 B2
(45) Date of Patent: Jul. 3, 2007

(54) SLIDER

(75) Inventors: Mitsuyoshi Sayama, Hiratsuka (JP); Hirohito Suzuki, Hiratsuka (JP)

(73) Assignee: Tanaka Kikinzoku Kogyo K.K., Chuo-Ku, Tokyo (JP)

( * ) Notice: Subject to any disclaimer, the term of this patent is extended or adjusted under 35 U.S.C. 154(b) by 459 days.

(21) Appl. No.: 10/837,588

(22) Filed: May 4, 2004

(65) Prior Publication Data

US 2005/0013050 A1    Jan. 20, 2005

(30) Foreign Application Priority Data

Jul. 14, 2003    (JP) ............................. 2003-274088

(51) Int. Cl.
 *H01H 1/14*    (2006.01)
(52) U.S. Cl. ..................... 200/239; 200/252
(58) Field of Classification Search ............... 200/275, 200/536, 571, 541, 550, 563, 279, 284, 252, 200/239
See application file for complete search history.

(56) References Cited

U.S. PATENT DOCUMENTS

| | | | |
|---|---|---|---|
| 3,839,614 A * | 10/1974 | Saganowski et al. .... | 200/43.17 |
| 3,894,203 A * | 7/1975 | Diehr ......................... | 200/6 R |
| 4,051,349 A * | 9/1977 | Englund ................. | 235/130 R |
| 4,137,438 A * | 1/1979 | Sato et al. .................. | 200/561 |
| 4,204,098 A * | 5/1980 | Strande ....................... | 200/1 R |
| 4,527,021 A * | 7/1985 | Morikawa et al. .......... | 200/5 A |
| 4,647,734 A * | 3/1987 | Dana ......................... | 200/43.06 |
| 4,723,195 A * | 2/1988 | Mizzi et al. ................ | 361/729 |
| 5,043,540 A * | 8/1991 | Takano ...................... | 200/16 C |
| 5,111,011 A * | 5/1992 | Roswold ..................... | 200/550 |
| 5,134,257 A * | 7/1992 | Oka et al. ................ | 200/19.33 |
| 5,659,294 A * | 8/1997 | Schroder .................... | 340/602 |
| 5,796,058 A * | 8/1998 | Aimi et al. ............... | 200/16 D |
| 5,898,147 A * | 4/1999 | Domzalski et al. ......... | 200/1 B |
| 6,121,560 A * | 9/2000 | Turkmen .................... | 200/271 |

(Continued)

FOREIGN PATENT DOCUMENTS

JP          06-111916         4/1994

(Continued)

*Primary Examiner*—Michael Friedhofer
*Assistant Examiner*—Lisa Klaus
(74) *Attorney, Agent, or Firm*—Rothwell, Figg, Ernst & Manbeck, PC

(57) ABSTRACT

The present invention provides a slider which is less likely to cause a drastic change in a contact state such as instantaneous disconnection. The slider according to the present invention has teeth 13 of a comb shaped like a narrow sheet being rectangular in cross section and making a contact at a tip of the teeth with a surface to be slid on. The slider has a slider body extending to a proximal end side of the teeth 13 of a comb, and the teeth 13 of a comb has at the tip thereof a projection 13a, which is narrower than the width dimension of a proximal end portion of the teeth of a comb. A slider having such teeth 13 of a comb will prevent a drastic change in a contact state such as instantaneous disconnection between the tip of the teeth 13 of a comb of the slider and a surface to be slid on from occurring, so that generation of noise in signals (or electric current) flowing through the slider and deterioration in resistance properties of the slider are prevented.

6 Claims, 9 Drawing Sheets

U.S. PATENT DOCUMENTS

| | | | |
|---|---|---|---|
| 6,144,545 A * | 11/2000 | Lee et al. | 361/233 |
| 6,506,989 B2 * | 1/2003 | Wang | 200/181 |
| 6,727,445 B2 * | 4/2004 | Cullinan et al. | 200/85 R |
| 6,856,261 B2 * | 2/2005 | Yoritsune et al. | 341/16 |
| 6,868,259 B1 * | 3/2005 | Kitamura et al. | 455/90.3 |
| 6,995,324 B2 * | 2/2006 | Asada | 200/1 B |

FOREIGN PATENT DOCUMENTS

| | | |
|---|---|---|
| JP | 06-275356 | 9/1994 |
| JP | 07-085937 | 3/1995 |

* cited by examiner (a)

(d)

(b)

(e)

(c)

(f)

(a)

(d)

(b)

(e)

(c)

(f)

PRIOR ART

(a)

(b)

SLIDER

BACKGROUND OF THE INVENTION

1. Technical Field

The present invention relates to a slider, which is contacted with a surface to be slid on, in particular to a slider, which is employed with a potentiometer or the like.

2. Description of the Related Art

As a slider, which is employed with a potentiometer for a position sensor or the like, it has been proposed, for example, one shaped like teeth of a comb provided with a plurality of rectangular tongues (teeth of a comb) as shown in FIG. 8 (See FIG. 1 of Japanese Patent Application Laid-Open No. 275356/1994, FIG. 5 of Japanese Patent Application Laid-Open No. 85937/1995, and FIG. 2 of Japanese Patent Application Laid-Open No. 111916/1994). As shown in the figures, the tongues (teeth of a comb) of the sliders have flat end surfaces. The conventional sliders having such teeth of a comb are used with the flat end surfaces kept contacted across the full width thereof with a surface to be slid on.

In the meantime, sliding of a slider on a surface to be slid on produces abrasion powder and sometimes leaves the abrasion powder on the surface to be slid on. If the abrasion powder remains on the surface to be slid on, the slider will inevitably climb over the abrasion powder during sliding on the surface to be slid on. On this occasion, the contact state between the tip of the teeth of a comb of the slider and the surface to be slid on drastically changes, thereby for example causing instantaneous disconnection of a signal or electric current therebetween. Such a drastic change in a contact state is not preferable because it may cause noise generation in a signal or electric current flowing through a slider and may cause deterioration of the resistance properties of a slider.

SUMMARY OF THE INVENTION

The present invention has been made in view of the above-described problems, and it is a subject of the present invention to provide a slider, which is less likely to cause such drastic changes. in contact conditions as instantaneous disconnection.

The present invention achieves the subject, and provides a slider, which comprises: at least one sheet metal tongue being rectangular in cross section and making contact at a tip thereof with a surface to be slid on; and a slider body extending to a proximal end side of the tongue, and the tongue has at the tip thereof a projection, which is narrower than the width dimension of a proximal end portion of the tongue.

The slider according to the present invention is used with the projection on the tip of the tongue kept contacted with a surface to be slid on. The slider slides on the surface to be slid on while pushing aside abrasion powder even if such abrasion powder is present on the surface to be slid on, thereby maintaining a slide state without climbing over the abrasion powder. Therefore, narrowing the width of an end contacted with a surface to be slid on through providing a projection on the tip of the tongue allows abrasion powder to be pushed aside in a more facilitated manner. Such a narrowed contact end will prevent "climbing over" more positively because the amount of abrasion powder against which the contact end smashes will decrease proportionately. Furthermore, the tip of the tongue of the slider are secured contacted with the surface to be slid on by repulsion, which generates when the tip of the tongue is pressed against the surface to be slid on. Therefore, narrower tip of the tongue in terms of width will impart repulsion onto the narrower area in a concentrated manner proportionately, thereby securing an action of pushing aside abrasion powder more positively. Once climbing over abrasion powder is prevented, drastic changes in contact conditions such as instantaneous disconnection between the tongue and surface to be slid on are also prevented. Consequently, generation of noise in signals (or electric current) flowing through the tongue of the slider and deterioration in resistance properties of the slider will be prevented.

It is preferable if the projection has at the end thereof one contact end to be made a point contact with a surface to be slid on, because it securely provides an action that sliding on a surface to be slid on while pushing aside abrasion powder present on the surface to be slid on. As surface profiles, various rounded surface shapes, which can make a point contact with a planar are possible including a sphere, elliptic surface, hyperboloid, and round surface formed through curving a cylinder or rounded bar.

The slider can make a contact with a surface to be slid on if it is provided with at least one tongue. However, in terms of securing a stable contact condition, it is preferable if the slider is formed like teeth of a comb, which have a plurality of tongues. Therefore, the normally employed in actual potentiometers for instance is a slider formed like teeth of a comb, which have a plurality of tongues.

Incidentally, among the conventional sliders, there has been proposed one which has tongues (teeth of a comb) made of wire as shown in FIG. 9 (see Japanese Patent Application Laid-Open No.111916/1994). However, when the tongue is made of wire, such a problem as unstable contact condition during sliding is sometimes caused. As a result of study, it was found that a tongue made of wire easily deflects not only in a longitudinal direction but also in a width direction, and the above-described problem may be attributed to such a physical property. In other words, it is considered that since a tongue made of wire easily deflects in a width direction when it pushes aside abrasion powder present on a surface to be slid on, a series of actions "from generation of deflection to return to the original state" destabilize the contact condition between the tongue and surface to be slid on. In contrast, the tongue of the slider according to the present invention has a narrow sheet shape being rectangular in cross section, so that hardly deflects in a width direction while maintaining flexibility in a longitudinal direction. That means the tongue of the slider according to the present invention hardly deflects in a width direction when it pushes aside abrasion powder present on a surface to be slid on. Thus, the tongue having a projection at the tip thereof and shaped like a narrow sheet being rectangular in cross section more stabilizes the sliding contact state between tongue and surface to be slid on.

The above description is made regarding a contact stability. When a study is made in terms of an improvement of a contact reliability of a tongue (teeth of a comb) with a surface to be slid on, it is found preferable if a tongue has at the tip thereof a plurality of projections that are narrower than the width dimension of a proximal portion of the tongue.

A slider to be employed in for instance a potentiometer is preferable if the slider is excellent in reliability in a contact state with respect to a surface to be slid on. In this regard, a tongue (teeth of a comb) having at the tip thereof a plurality of projections is more reliable in terms of a contact state compared to a counterpart having single projection because of the multiplicity of contact points with the surface to be slid on. For this reason, it is preferable if the tongue has at the tip thereof a plurality of projections. However, the tongue of a slider to be employed in a potentiometer or the like has a micro structure of 1 mm or less. The rectangular sheet metal tongue being rectangular in cross section is normally formed through pressing. Therefore, processing limitations will be encountered if an attempt is made to increase the number of points being contacted with a surface to be slid on, by narrowing the width of the tongue and increasing the number of the tongues. In this regard, a processing to form a plurality of projections on the tip of the tongue is more preferable than that to form a narrower tongue in that the former is easier. Moreover, forming a plurality of projections on the tip of the tongue is preferable in terms of increased reliability of a contact state due to the increased number of projections.

However, as a result of study, it was found out that increasing contact points would not necessarily improve a contact reliability in a case where, for instance, a slider is made contacted with a surface to be slid on that makes a rotary motion. It is considered it relates to properties of a motion state of rotation. More concretely, when a slider is installed for use with a surface to be slid on that makes a rotary motion, the slider is normally installed with the slider being slantwise with respect to the surface to be slid on although the reason is not known precisely, and under the circumstances this is considered to easily damage contact properties. If a slider is installed in a slantwise manner with respect to a surface to be slid on, the tongue (teeth of a comb) T of a slider will assume a state of contact with the surface to be slid on at the side end position of the tongue, as shown in FIG. 10(a). In this case, if being provided with a plurality of projections, the tongue can only make a contact at the side end thereof with the surface to be slid on. That is to say, improvement of reliability cannot be expected even if a plurality of projections are provided on the tongue. It should be noted that the tongue is vulnerable to an extraordinary wear at the tip thereof at earlier stages of use under the condition shown in FIG. 10(a). At advanced stages of use, the contact area will enlarge due to wear, pressure strength of the tip of the tongue against the surface to be slid on will be applied in a dispersed manner, and the slanted state of the tongue will be maintained. Consequently, it is also considered that an unstable state between the tip of the tongue and the surface to be slid on is maintained.

As a result of study, for more improving a contact stability of a slider being installed with respect to a surface to be slid on, which effects a rotary motion, it is preferable if the tongue (teeth of a comb) of the slider has at the tip thereof single projection.

As discussed above, the tip of the tongue of the slider contacts with a surface to be slid on with the tip pressed against the surface, and the contact state with the surface to be slid on is secured by means of repulsion generated from the pressure onto the tongue. Therefore, if the number of projection being contacted with a surface to be slid on is restricted to one per tongue, generated repulsion will be imparted intensively to a contact position of the projection (see FIG. 10(b)). Then, inconvenience such as instantaneous disconnection will be securely prevented from occurring, thereby stabilizing contact stability. A tongue provided with single projection always makes a contact at the same projection with a surface to be slid on regardless of the installed positions slanted or not. In contrast, if installed in a slanted manner, a tongue provided with a plurality of projections makes a contact not at a central projection but at a side end one with a surface to be slid on. Thus, a tongue provided with single projection always makes a contact at the same projection with a surface to be slid on, and will be improved in a contact reliability compared with a counterpart provided with a plurality of projections, which make contact at variable projections in accordance with the conditions.

When single projection is formed on the tip of a tongue (teeth of a comb), it is preferable if the projection is formed at a middle position in a width direction of the tip of the tongue, because such a tongue hardly gets twisted and can secure a more stable contact state. For example, the projection should be preferably formed at a position where a middle position of a proximal end of the projection and a middle position in a width direction of the tip of the tongue coincide with each other.

Various shapes are conceivable in regard to a tongue (teeth of a comb) of a slider, however it is preferable if it is rectangular and has a constant width dimension, and further if it has an above-discussed projection at the tip of the rectangular part. Various shapes, such as tapered or reverse-tapered, are also conceivable in regard to a sheet metal tongue. However, in that case, the tongue will be easily deflected in a width direction at a thin distal end or a thin proximal end thereof.

Further, it is preferable if the projection at the tip of the tongue (teeth of a comb) has a width of which dimension is narrower than that of the tip of the tongue (or the rectangular portion). The reason is that if the width is broader than the width dimension of the tip of the tongue, in a case of a slider shaped like teeth of a comb, that is to say having a plurality of tongues, the contact ends of the tip of the tongues are likely to interfere with the counterparts of the adjacent tongues, and the interference is likely to cause instantaneous disconnection. Forming only a projection of the tip of a slider broad in width is not preferable from the viewpoint that the processing is difficult.

As a proximal end of a projection such as a contact end to be formed at the tip of a projection of a tongue (teeth of a comb), it is preferable if the proximal end has a curved surface, which is formed through irradiation of beams of high-energy density. A processing method employing irradiation of beams of high-energy density means, for example, a processing in which beams of high-energy density including laser beams and electron beams are irradiated to heat, fuse and coagulate portions to be irradiated (only referred to as laser processing). As processing methods of forming a curved surface of a contact end, there are various methods including barreling, blasting, mechanical polishing such as buffing or polishing with sandpaper, and electric discharging, as well as a laser processing. These processing methods can be employed, however a laser processing is preferable as a method for processing a curved surface because a smooth curved surface (contact end) can be obtained in a facilitated manner.

DETAILED DESCRIPTION OF THE PREFERRED EMBODIMENTS

Preferable embodiments of the slider according to the present invention are described below.

Embodiment 1

Figure 1:
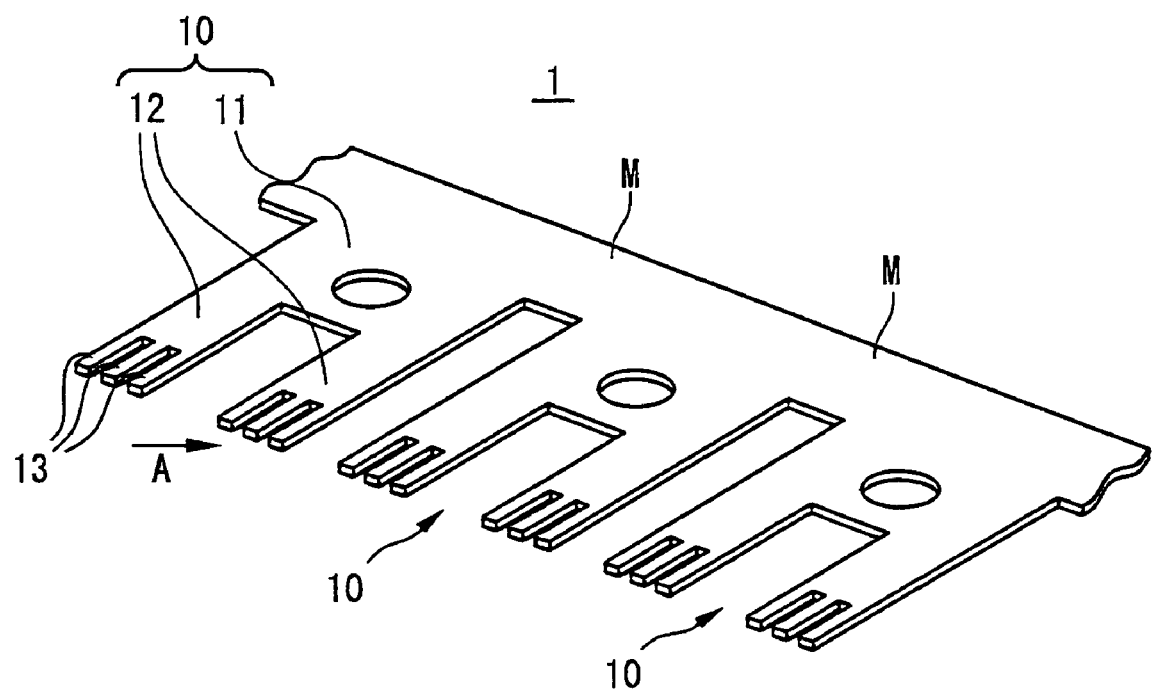
FIG. 1 is a perspective view showing a strip-like material obtained through pressing.

A sheet material made of Ag—Pd—Cu alloy and having a thickness 0.07 mm was firstly prepared, and thus prepared sheet material was subjected to pressing to provide a strip-like material 1, which has a band of slider pieces 10 as shown in FIG. 1. In the strip-like material 1, each slider piece 10 continues into an adjacent counterpart 10 via an allowance M for cutting at a body (i.e. slider body) 11.

Figure 2:
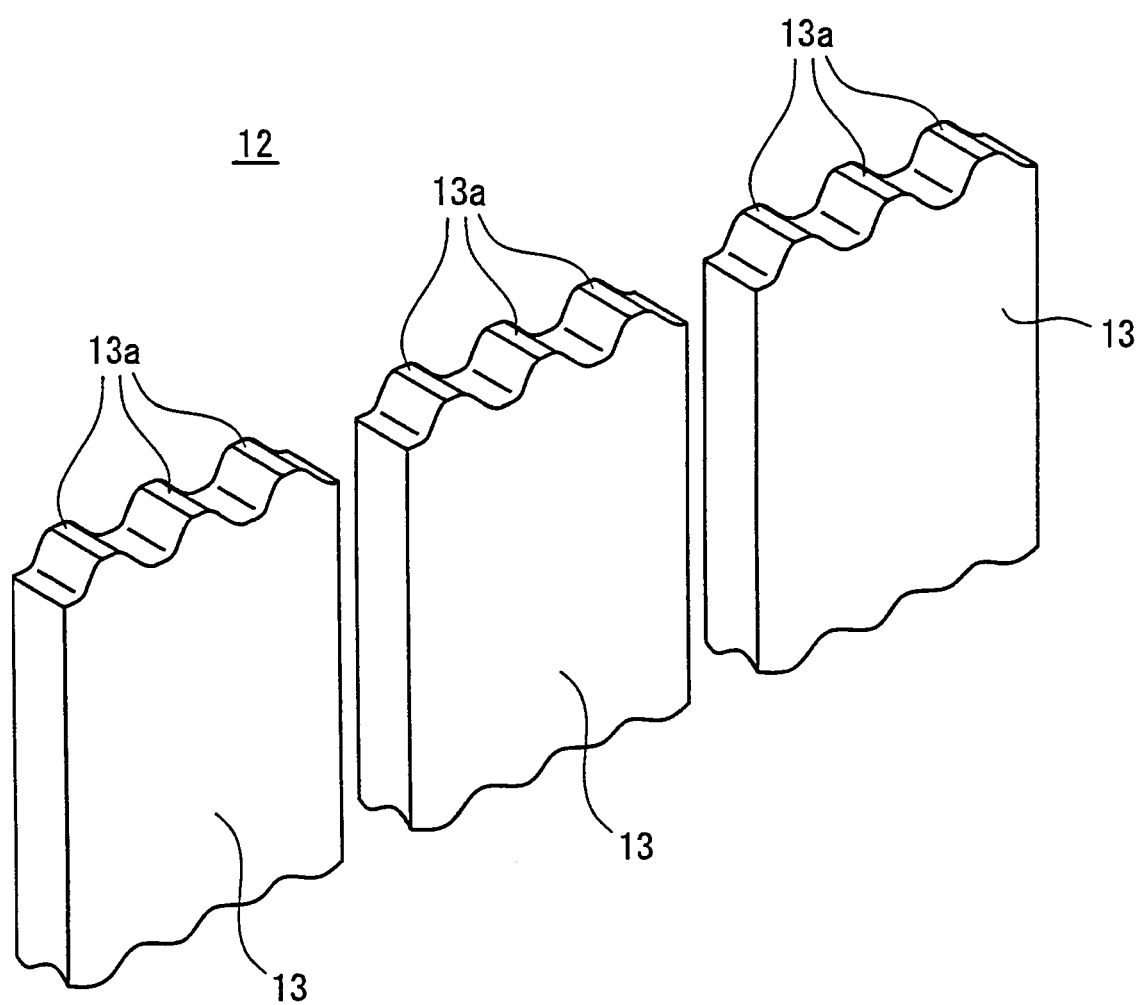
FIG. 2 is an enlarged perspective view showing each tip of the comb teeth of a slider piece made of a strip-like material obtained through pressing, observed from a direction of an arrow A shown in FIG. 1.
Figure 3:
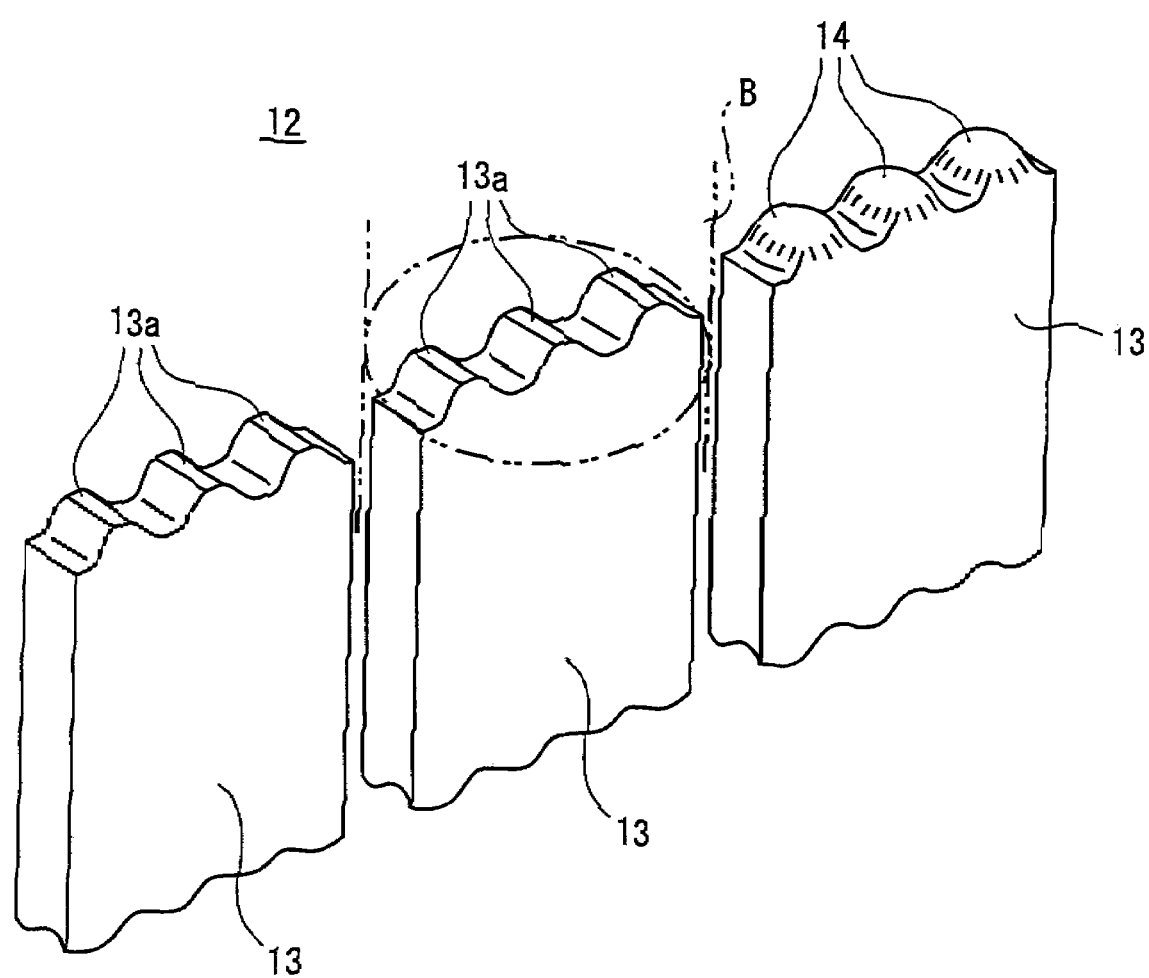
FIG. 3 is an enlarged perspective view showing each tip of the comb teeth irradiated with laser beam.

As shown in the figure, each slider piece 10 consists of a body 11 and two brushes 12 extending from the body 11. Each brush 12 has three teeth of a comb (tongue) 13, which line up like teeth of a comb and have the same length. All the teeth 13 of a comb are arranged in parallel with one another, and formed so that the tips thereof are flush with one another. The shape of each tooth is like a narrow sheet being rectangular in cross section, namely wide shape having a larger dimension of width than that of thickness. As FIG. 2 shows, a projection 13a was formed on each tooth 13 of a comb simultaneously through pressing in this Embodiment. As is apparent from the figure, each tooth 13 of a comb has a smaller width dimension than that of the tooth 13 of a comb. In this case, the width dimension of each tooth 13 of a comb was 0.4 mm.

After pressing, the obtained strip-like material 1 was retained with the use of a jig (not shown), laser beams B were irradiated in turn to each projection 13a on the tip of each tooth 13 of a comb to heat and fuse the tip of each projection 13a. Then, the tip of each projection 13a was coagulated to form at the tip of each tooth 13 of a comb a rounded surface (contact end) 14 to be contacted with a surface to be slid on. In this Embodiment, YAG laser was employed as a laser medium, and laser beam B was irradiated pulse by pulse onto the tip of each projection 13a. The duration of irradiation (=pulse length) was 0.5 millisecond, and the output (energy amount) of 1 P (pulse) was 0.3 J/P. The beam diameter of the laser beam was adjusted to 0.6 mm so that entire tip of the projection 13a could be exposed to a laser beam at one shot.

Figure 5:
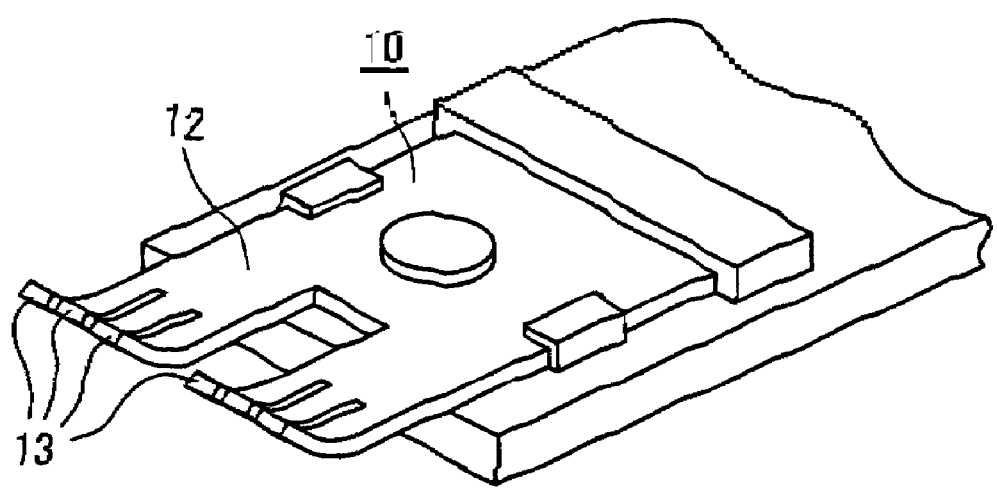
FIG. 5 is a perspective view showing a mode of use of a slider.

After the process of laser beam irradiation, the strip-like material 1 was heat-treated under a heating condition of 350° C. for 2 hours. Measurement of the Vickers hardness in the vicinity of the tip of the teeth 13 of the slider piece 10 after the heat treatment revealed hardness numbers of 300±30 Hv. It is assumed that the heat treatment caused precipitation hardening. Further, after the heat treatment, the tip of the teeth 13 of a comb was subjected to bending to provide a strip-like material 1 provided with slider pieces 10 having teeth 13 of a comb of which tip being bent. Regarding the bent shape of the teeth of a comb, see the teeth 13 of a comb of a slider as shown in FIG. 5. The slider pieces 10 of the strip-like material 1 are used with the pieces cut into individual sliders 10', for example as shown in FIG. 5. It should be noted that the slider 10' shown in FIG. 5 has teeth 13 of a comb of which tips still have a planar shape.

Figure 4:
FIGS. 4(a) through (c) are photographs showing each tip of the comb teeth not yet irradiated with laser beam.
FIGS. 4(d) through (f) are photographs showing each tip of the comb teeth irradiated with laser beam.
Figure 4:
Figure 4:
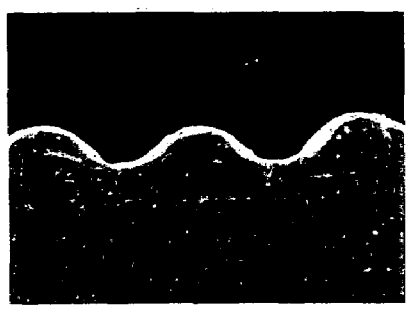
Figure 4:
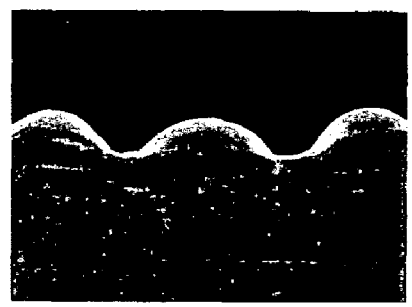
Figure 4:
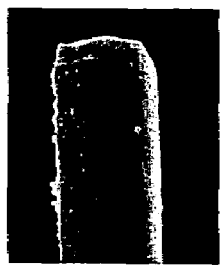
Figure 4:

As FIGS. 4(a) through (c) show, the end surface of the teeth 13 of a comb, which has not yet processed with laser beam irradiation is a surface formed through pressing and thus had irregular concavity and convexity and angular portions. However, as FIGS. 4(d) through (f) show, the round surface 14 of the tips of both the processed teeth 13 of a comb and projections 13a took on a smooth Oust like a mirror finished surface) and spherical surface, which allowed a point contact with a plane.

If the projections 13a of the teeth 13 of a comb can be shaped so as to carry out a point contact with a surface to be slid on, the teeth of a comb of the slider 10 will slide while pushing aside abrasion powder even if such abrasion powder are present on the surface to be slid on. Thus, the teeth of a comb will slide without climbing over the abrasion powder. Once climbing over abrasion powder is inhibited, generation of both instantaneous disconnection and noise in signals (or electric current) flowing through a tongue of a slider as well as deterioration in resistance properties of a slider can be prevented. Further, the slider according to the present invention allows a point contact with a surface to be slid on at three points of each tooth 13 of a comb, and will be superior in terms of contact reliability to a slider, which contacts at single point.

Embodiment 2

A sheet material prepared in a manner identical to the case in Embodiment 1 was subjected to pressing to provide a strip-like material (not shown but see FIG. 1 for its appearance), which has a band of slider pieces like those in Embodiment 1. In this Embodiment, a processing for shaping the tip of each tooth 13 of a comb simultaneously during pressing to provide a strip-like material 1 provided with a slider piece 10 having a projection 13a on a center of a tip of each tooth 13 of a comb, as FIG. 6(a) shows.

Figure 6:
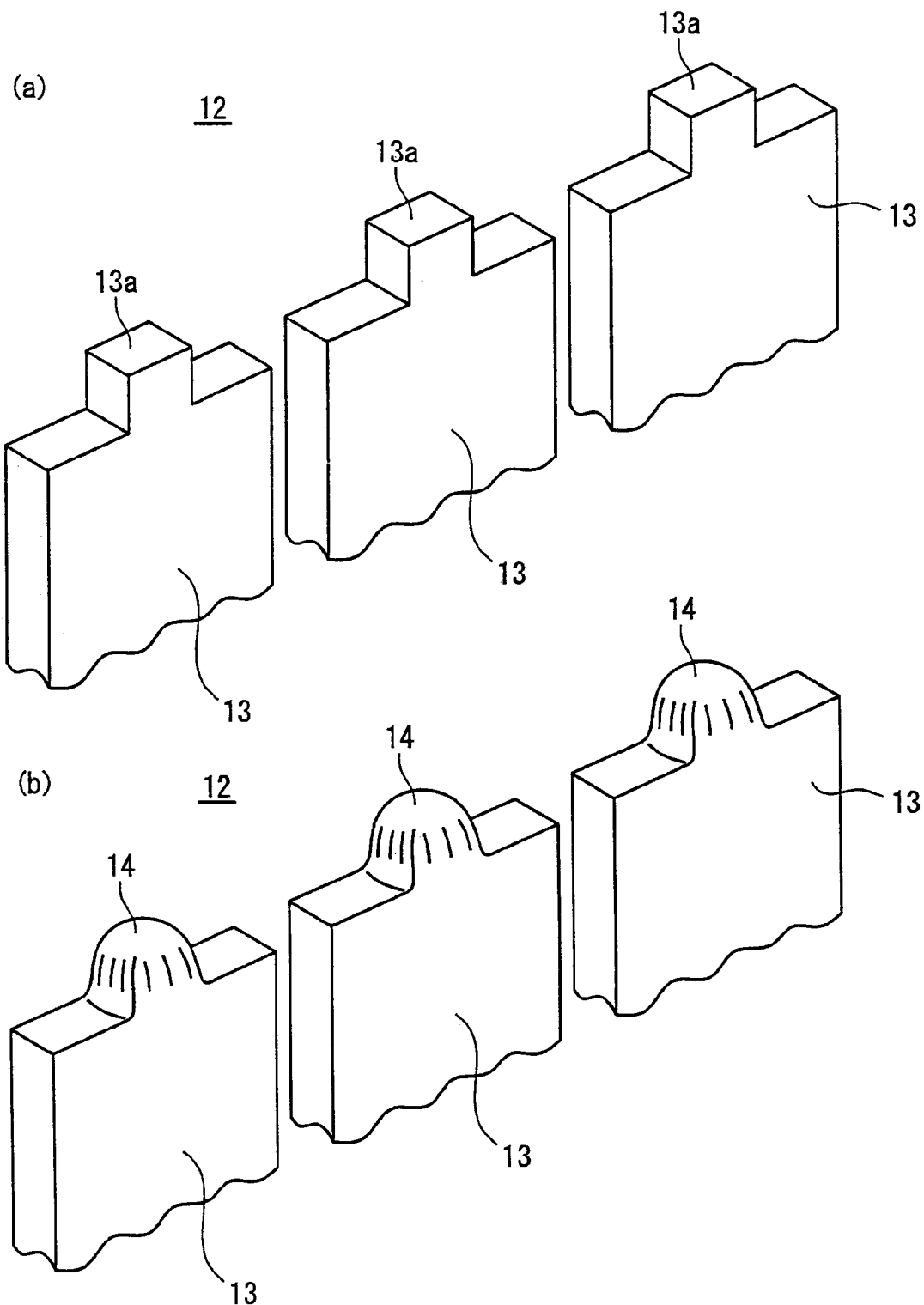
FIG. 6(a) is an enlarged perspective view showing each tip of the comb teeth of a slider piece made of a strip-like material obtained through pressing in another Embodiment.
FIG. 6(b) is an enlarged perspective view showing each tip of the comb teeth irradiated with laser beam.

After pressing, laser beams were irradiated to the tip of the projection 13a of each tooth 13 of a comb to form at the tip of the projection 13a a rounded surface 14 to be contacted with a surface to be slid on, as FIG. 6(b) shows. Subsequently, a heat treatment was carried out to precipitation-harden the projection 13a of the tip of the teeth 13 of a comb. Further, after the heat treatment, the tip of the teeth 13 of a comb was subjected to bending to provide a strip-like material provided with slider pieces (see the sliders 10' in FIG. 5) having teeth of a comb of which tip being bent. Since the irradiating conditions of laser beams were the same as those in Embodiment 1 other than the output of 1 P was 0.33 J/P, further description will be omitted. Incidentally, the conditions of a heat treatment and bending were also the same as those in Embodiment 1.

Figure 7:
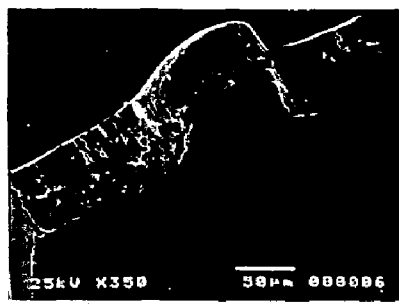
FIGS. 7(a) through (c) are photographs showing each tip of the comb teeth not yet irradiated with laser beam in yet another Embodiment.
FIGS. 7(d) through (f) are photographs showing each tip of the comb teeth irradiated with laser beam.
Figure 7:
Figure 7:
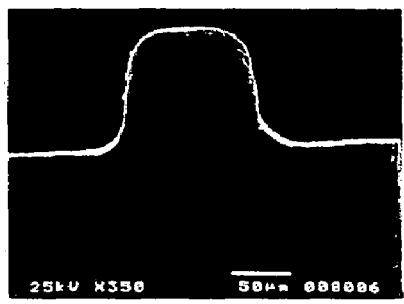
Figure 7:
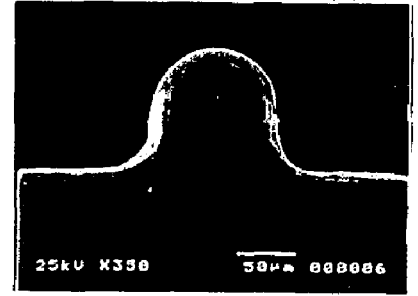
Figure 7:
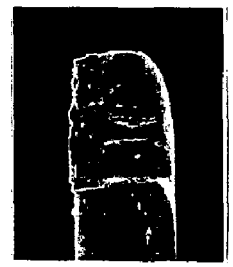
Figure 7:
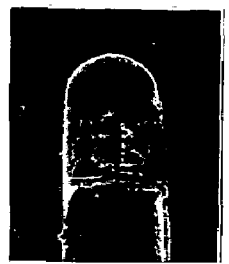
Figure 8:
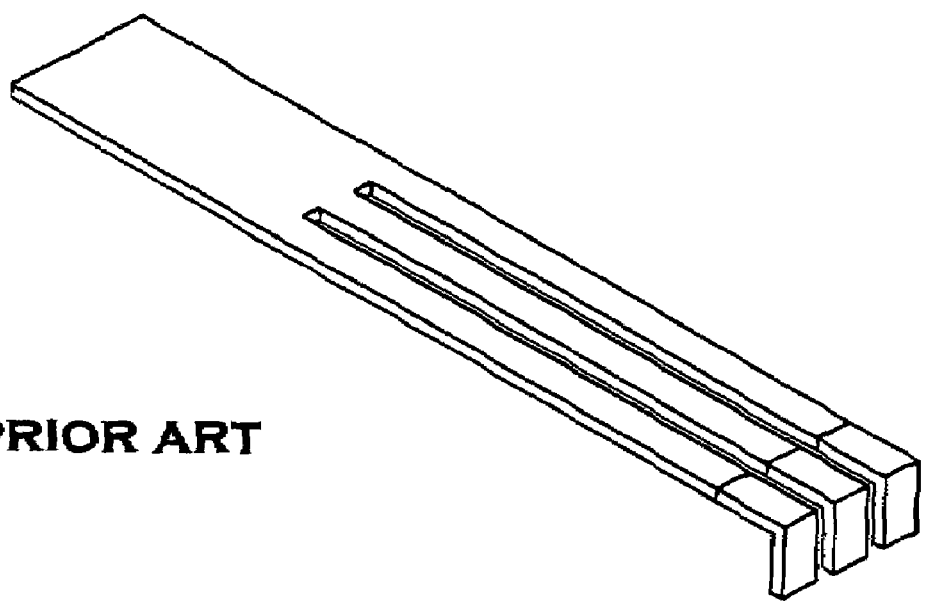
FIG. 8 is a perspective view showing a conventional slider.
Figure 9:
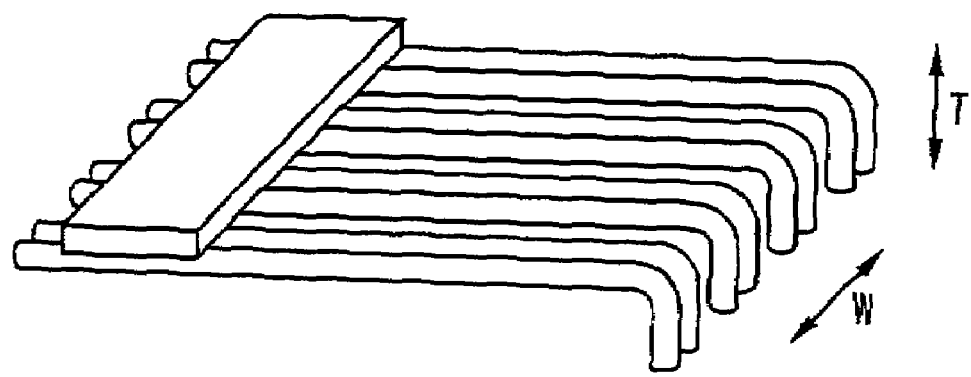
FIG. 9 is a perspective view showing another conventional slider.
Figure 10:
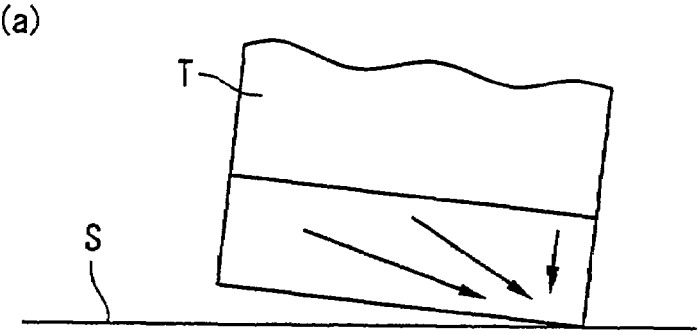
FIG. 10 is a front elevational view showing a tip of tongue for the sake of description of the tip state of a slider tongue.
Figure 10:
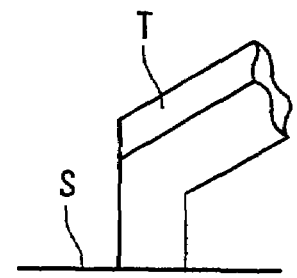
Figure 10:
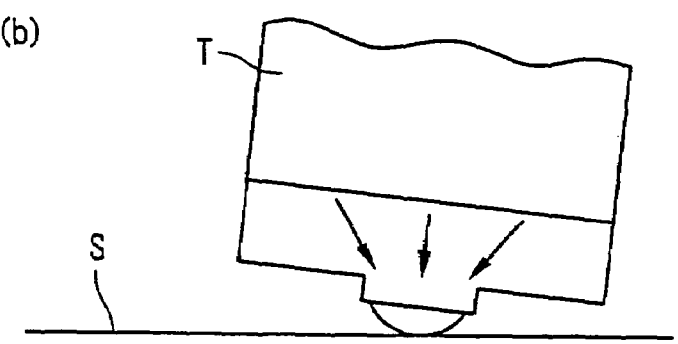
Figure 10:
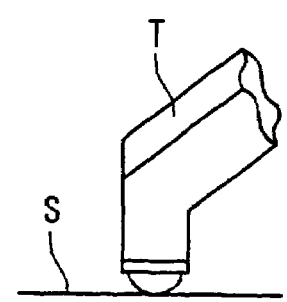

As FIGS. 7(a) through (c) show, the end surface of the teeth 13 of a comb, which has not yet processed with laser beam irradiation is a surface formed through pressing and thus had irregular concavity and convexity and angular portions. However, as FIGS. 7(d) through (f) show, the round surface 14 of the tips of both the processed teeth 13 of a comb and projections 13a took on a smooth Oust like a mirror finished surface) and spherical surface, which allowed a point contact with a plane. If the projections 13a of the teeth 13 of a comb can be shaped so as to carry out a point contact with a surface to be slid on, climbing over abrasion powder by the teeth 13 of a comb will also be prevented as in the case of Embodiment 1. Once climbing over abrasion powder is inhibited, generation of both instantaneous disconnection and noise in signals (or electric current) flowing through a slider as well as deterioration in resistance properties of a slider can be prevented. Further, the slider 10 according to the present invention makes a point contact with a surface to be slid on at the tip of a projection 13a provided for every tooth 13 of a comb. When a slider is installed with respect to a surface to be slid on in rotational motion, the slider tends to be installed in an inclined manner with reference to the surface to be slid on, and consequently instantaneous disconnection and noise will be easily generated as discussed above. In this respect, the slider 10 according to the present Embodiment having a structure where every tooth of a comb has a projection formed thereon makes a contact at a point with a surface to be slid on allows repulsion, which generates when the teeth 13 of a comb are pressed against the surface to be slid on, to be imparted in a concentrated manner only on single contact point present on every tooth of a comb, so that instantaneous disconnection and noise will less likely to happen. Consequently, the contact stability of claws, i.e. projections, of the slider are improved.

INDUSTRIAL APPLICABILITY

Even if abrasion powder is present on a surface to be slid on, the slider according to the present invention maintains sliding on the surface while pushing aside the powder, so that drastic changes including instantaneous disconnection can be prevented, thereby securing a stable contact condition. Thus, the present slider is suitable as a slider used, for example, with a potentiometer including a position sensor.

What is claimed is:

1. A slider comprising: at least one sheet metal tongue being rectangular in cross section and making contact at a tip thereof with a surface to be slid on; and a slider body extending to a proximal end side of said tongue,
    wherein said tongue has on an end face being rectangular in cross section of a tip thereof a projection, which is narrower than the width dimension of a proximal end portion of said tongue.

2. A slider according to claim 1, wherein the projection has at a tip thereof one contact end portion, which makes a point contact with a surface to be slid on.

3. A slider according to claim 1, wherein the tongue has on the end face of a tip thereof one projection.

4. A slider according to claim 3, wherein the projection is formed on the end face of the tip of the tongue at a center of the tongue in terms of a width direction.

5. A slider according to claim 1, wherein the tongue has on the end face of the tip thereof a plurality of projections.

6. A slider according to claim 1, wherein the tip of the projection of the tongue is formed through irradiation of beams having high-energy density.

* * * * *